United States Patent [19]

Goss

[11] Patent Number: 5,731,931
[45] Date of Patent: Mar. 24, 1998

[54] MONOCOQUE SUSPENSION

[75] Inventor: Lloyd C. Goss, Bloomington, Minn.

[73] Assignee: Hutchinson Technology Incorporated, Hutchinson, Minn.

[21] Appl. No.: 723,510

[22] Filed: Sep. 30, 1996

Related U.S. Application Data

[63] Continuation of Ser. No. 216,494, Mar. 22, 1994, abandoned.

[51] Int. Cl.⁶ .................................. G11B 5/49; G11B 17/32
[52] U.S. Cl. .................................................... 360/104
[58] Field of Search ................................. 360/103, 104, 360/105

[56] References Cited

U.S. PATENT DOCUMENTS

| | | | |
|---|---|---|---|
| 4,645,280 | 2/1987 | Gordon et al. | 339/17 F |
| 4,670,804 | 6/1987 | Kant et al. | 360/102 |
| 4,792,875 | 12/1988 | Ohdaira | 360/104 |
| 4,797,763 | 1/1989 | Levy et al. | 360/104 |
| 4,819,094 | 4/1989 | Oberg | 360/104 |
| 5,027,241 | 6/1991 | Hatch et al. | 360/105 |
| 5,121,273 | 6/1992 | Slezak | 360/104 |
| 5,185,683 | 2/1993 | Oberg et al. | 360/104 |
| 5,198,945 | 3/1993 | Blaeser et al. | 360/104 |

FOREIGN PATENT DOCUMENTS

| | | | |
|---|---|---|---|
| 59-207065 | 11/1984 | Japan | 360/103 |
| 60-246015 | 5/1985 | Japan | . |
| 61-63974 | 4/1986 | Japan | 369/244 |
| 63-261584 | 10/1988 | Japan | 360/104 |
| 2-15412 | 1/1990 | Japan | 360/103 |
| 4-26913 | 1/1992 | Japan | 360/103 |
| 4-61674 | 2/1992 | Japan | 360/104 |
| 4219618 | 8/1992 | Japan | 360/103 |
| 4291066 | 10/1992 | Japan | 360/103 |
| 5-36049 | 2/1993 | Japan | 360/103 |

*Primary Examiner*—Stuart S. Levy
*Assistant Examiner*—William J. Klimowicz
*Attorney, Agent, or Firm*—Faegre & Benson

[57] ABSTRACT

A suspension for positioning a floating read-write head assembly over selected tracks on the surface of a rotating data storage device. It includes a planar and resilient load beam having a proximal end portion that may be constructed for attachment to an actuator arm, a gimbal region located at a distal end portion constructed for supporting a read-write head assembly for gimballed motion relative to the surface of the data storage device, a spring region between the proximal end portion, and a rigid floor region located between the spring region and the gimbal region. The suspension also includes a sheet material shell region having side wall regions supporting a ceiling region over a face of the rigid floor region of the load beam. The wall regions may include longitudinally extending edge flanges projecting generally away from the ceiling region and from the rigid region, lip edges to facilitate attachment, and lift surfaces. The wall regions attach the shell to a face of the floor region of the load beam to cover at least the floor region and form into a stiffened monocoque region encasing a cavity between the load beam and the shell region. A method for manufacturing the suspension is also disclosed.

11 Claims, 5 Drawing Sheets

MONOCOQUE SUSPENSION

This application is a continuation of U.S. application Ser. No. 08/216,494 filed Mar. 22, 1994, now abandoned.

FIELD OF THE INVENTION

The present invention relates to an improved suspension for use in dynamic storage devices or rigid disk drives. More particularly, the present invention relates to an improved suspension that provides higher rigidity while reducing mass, through the use of monocoque shell construction.

BACKGROUND OF THE INVENTION

The speed and capacity of today's computers requires storage systems that are capable of almost instantaneously retrieving and storing voluminous amounts of information. The preferred medium for achieving this objective is rotating data storage devices that store the information on disk files in dynamic storage devices or rigid disk drives. Disk files consist of one or more rotatable disks on which data is written concentrically and at extremely high densities. Each one of the thin concentric circles where data is stored is called a track. When the data storage device is in operation, an extremely sensitive transducer reads and writes information to and from selected tracks.

The transducer is usually attached to an air bearing slider which glides on a cushion of air nanometers away from the surface of the rapidly spinning disk. The transducer and air bearing slider assembly is also known as a "head" or head assembly.

A head suspension, which in turn may be attached to and moved by an actuator arm, is the spring element that supports the head. Head suspension refers to either a suspension with a head attached or a suspension designed to hold a head. A suspension (or suspension assembly) usually includes a load beam element, having carefully loaded spring regions and rigid regions, and a gimbal spring to hold the head level over the surface of the disk.

The carefully balanced combination of a suspension, a head, and other suspension related elements is known as a head suspension assembly (HSA). A multi-disk system will consist of several disks rotating in parallel to each other, with heads positioned both over the top and over the bottom surface of each disk by head suspensions and actuator arms that resemble those of a turntable. The whole assembly moves in and out very quickly over the disk to access information.

The average time required to get the head to a new track is called average seek time (typically less than 10 milliseconds). The average time required for data to reach the head from any given point on the track as the disk turns is called latency time (typically less than 6 milliseconds). Average access time is the combination of the average seek and latency times. Long access times result in significant delays due to the large number of data transfers required by today's systems. Therefore average access time is a crucial factor in marketing and operating a disk file system.

The closer the head can fly to the surface of the disk, the more densely can information be packed on its surface. Today's disk drives strive to reach head clearances close to 100 nanometers=0.1 micrometers (a human hair is 100 micrometers thick). Greater data densities allow for greater storage and smaller size. But the head must not touch the disk ("crash"), as the friction caused by the high rotational speed of the disk may damage the surface of the disk, thus destroying the data stored on it, as well as the head itself.

Constantly maintaining the desired head clearance is not an easy task as, when measured in nanometers, the surface of the disk is not flat and the head has to glide level and in parallel to the disk's contours. To compound the problem, the suspension which supports the head experiences extreme stresses as the actuator arm moves it rapidly from one concentric circle of data to the next. A suspension must be extremely stiff and rigid to withstand the shear forces of stop and go movement with minimum deflection. Stiffness measures the property of a material to resist deflection by the inertial loads involved in accelerations and decelerations. The suspension must also resist vibration after movement, as this delays the precise positioning of the head required for reading and writing closely packed data. Motion vibrations and excessive momentum cause the head to "overshoot" the intended thin track of data and take unacceptably long times to settle, thus causing errors and increasing the average access time. The suspension must also account for thermal expansion and surface vibration due to external forces.

Since the revolutions per minute (RPM) of the disk are constant, the velocities of the surface of the disk and of the air stream, increase as the head moves away from the center of the disk. Therefore, as the suspension moves from the inside track to the higher linear velocity outside tracks of the disk, it must resist changes in overall elevation. To hold the head at a controlled height the suspension must balance the pressure over the head to compensate the variable opposite lift of the changing air stream on the slider.

While being moved, the suspension must not twist (torque), or one corner of the head will be too close and the other too far from the disk surface. Yet, when flying over a single track, the suspension must be compliant to some pitch about a first axis and some roll about a second axis orthogonal to the first, in order to adjust the flight of the head over the contours of the disk. Thus, a flexible gimbal area which allows the head to remain level relative to the surface of the disk, even while a rigid region of the load beam experiences changes in inclination due to elevation changes, is desired. Yet, construction of this area must be as efficient as possible. Forming processes that change the topology of the suspension's surface to achieve gimbal flexibility add complexity to the manufacturing process.

The suspension also must be very light and have a low mass to reduce inertial momentum during each positioning movement. A large mass would result in sluggish head movement, overshoot problems, crashes, errors, and long access time. Also, since more complex systems consist of many suspensions moving in unison, even small reductions in the mass of each suspension permit significant reduced power to the actuator assemblies. This results in reduced power consumption and reduced heat buildup.

Finally, a suspension must allow for the convenient placement and transit of electrical conductors to carry electrical signals to and from the head. Optimally, the electrical conductors must be securely attached in order to reduce movement and vibration which causes fluctuating input and output impedances. They must exhibit low profiles, in order to fit in today's compact disk drives, and must have reliable and easy-to-use connection points.

In conclusion, the ideal suspension must maintain the careful balance that allows the correct flight of the head. It must be very low in mass, rigid and extremely stiff in some sections and directions, but flexible and adjustable in others. It should generate very little momentum and be impervious to extreme lateral forces and vibrations, but be ready to allow small and delicate adjustments to maintain head orientation. Electrical conductors must be able to easily transit and exit the length of the load beam. Finally, like any commercial product, it must be reliable and efficient to manufacture.

The prior art has tried to achieve this result in many different ways. A state of the art suspension (or suspension assembly) includes an elongated load beam, usually consisting of regions that are reinforced, prestressed, bent, or etched according to the need for rigidity or flexibility, a base plate at one end for mounting the load beam to an actuator arm, and a gimballing flexure at the other end for maintaining the head level near the surface of the disk. The combination of all the suspension elements and the head form part of a head suspension assembly. A head suspension assembly also includes conductors, usually copper wires, for transmitting electrical impulses to and from the head.

Copper wires sometimes cause problems due to their varying inductances, high profile, and demand for labor and machine intensive processes. There are other ways to transmit electrical signals. Existing systems relate to placing conductors directly on a conventional suspension. But neither wires nor thin and fragile insulating layers and electrical conductors readily transit through hinges, depressions, or raised reinforced areas. Suspension surfaces that have sharp edges or irregular surface topologies may chafe the outside insulator on wires or even sever electrical conductors, causing short circuits and making the conductors unreliable. Conductors placed on the outer surface of bend regions may also fracture as the bend regions flex.

Since the stiffness of the beam increases in proportion to the third power of its thickness, a common method for increasing the rigidity of the load beam has been to bond additional layers of stiffening material to the areas of the load beam where rigidity is required. A similar conventional solution has been to start out with a thicker load beam material and then change the surface topology of those portions of the load beam which require flexibility by etching, bending or prestressing the material.

The main problem with such solutions is that while the added thickness adds a measure of rigidity and stiffness to the load beam, such increase comes at the expense of significant additional mass. Furthermore, processes required to change the surface topology of the spring areas increase production time and reduce the cost effectiveness of suspension assembly manufacturing. In addition, a roughened surface topology leaves no smooth longitudinal path for placement of electrical conductors.

An alternative inventive suspension design involves forming side rails or flanges which extend longitudinally along the edges of the load beam where additional rigidity is required. The problem with such side rails is that they still require a relatively thick load beam material, that the side flanges can only increase rigidity and stiffness to a certain extent, and that although the flanges support the side regions, the inside region of the load beam is still subject to some torque and bending forces. The additional thickness necessary for the load beam also may create the need for additional preparation of the needed spring regions.

SUMMARY OF THE INVENTION

The present invention is directed to an improved head suspension in a hard disk drive. The suspension may attach to an actuator arm and serves to position accurately a floating read-write head assembly over selected tracks on a surface of a disk or rotating data storage device. It provides much increased rigidity and stiffness where desired and at the same time provides needed spring and gimballing regions that allow the head to fly correctly relative to the surface of the disk. This improved suspension achieves this result without any increase in mass, and possibly with reduced mass over other more traditional designs. It also minimizes the need for etching and tooling and leaves a flat unformed surface on which to run electrical conductors. The absence of alterations to the surface topology also eliminates additional steps in the manufacturing process.

The head suspension includes a resilient load beam having a distal end portion, a proximal end portion that may be shaped and reinforced for attachment to an actuator arm, and a spring region adjacent to the proximal end portion. The suspension also includes a gimbal region located at the distal end portion of the load beam, constructed for supporting a head assembly and for gimballed motion relative to the surface of the data storage device. Finally, a stiffened rigid monocoque region of the suspension is formed by a monocoque shell. This monocoque region exponentially increases the rigidity of the beam by transferring stresses to its outer skin. The monocoque region has a closed plane figure cross-section and includes a ceiling region separated and spaced from a floor region. The shell encases a chamber between these ceiling and floor regions.

The monocoque region can consist of one or more pieces. Methods known in the industry, such as welds, adhesive, or crimping, can attach the pieces together. The shell itself can include concave surfaces joined by soft round angles, planar surfaces joined by sharp radial breaks, or combinations of both rounded and planar surfaces. The pieces can be made of metal, alloy, ceramics, plastics or other substances with high stiffness to weight ratios. Lips and flanges can extend at any junction to facilitate assembly and attachment. U-shaped or electro-polished lift surfaces may be added at sharp edges.

A preferred embodiment of this suspension can be fabricated with stainless steel that is thinner and lighter than that of ordinary load beams. The thinner material allows for bending at spring regions without necessitating any surface material removal.

No etching or material removal means that the surface of the suspension remains flat and smooth. This allows electrical conductors that resemble printed circuits to run the length of a face of the suspension. Flex circuits and other suitable conductors also can be used. The conductors can be deposited directly on the surface of non-conductive suspensions, be individually electrically isolated, or rest on an added dielectric insulating coating. Additionally, a partial groove on selected areas of the load beam and gimbal region can receive the conductors and/or the insulating coating.

DESCRIPTION

The present invention is an improved suspension for positioning a floating read-write head assembly over selected tracks on the surface of a rotating data storage device. It includes a stiffening monocoque shell and a more efficient construction. This allows for a more precise, stiffer, lighter, and more efficiently manufactured head suspension assembly. Additionally, the absence of a need for additional processing, leaves on the suspension a smooth, flat surface ideal for placing electrical conductors.

A monocoque shell is a structure in which the outer skin carries all or a major part of the stresses. A cross sectional cut along a plane perpendicular to the longitudinal axis of a monocoque shell results in a closed plane figure such as an ellipse or a polygon. This stress bearing structure puts material at the optimal points and spreads the loads. Monocoque shells have been successfully applied in aircraft and race car construction where extraordinary rigidity and stiffness is required, but reduced weight is needed for optimal performance. Since the stiffness of a beam increases in proportion to the third power of the thickness of the cross-section of the beam, the added thickness of a closed figure monocoque shell cross-section can increase stiffness by orders of magnitude in comparison to traditional planar beams. The fact that the shell is hollow and that it can be fabricated with relatively thin walls further results in reduced mass.

Figure 1:
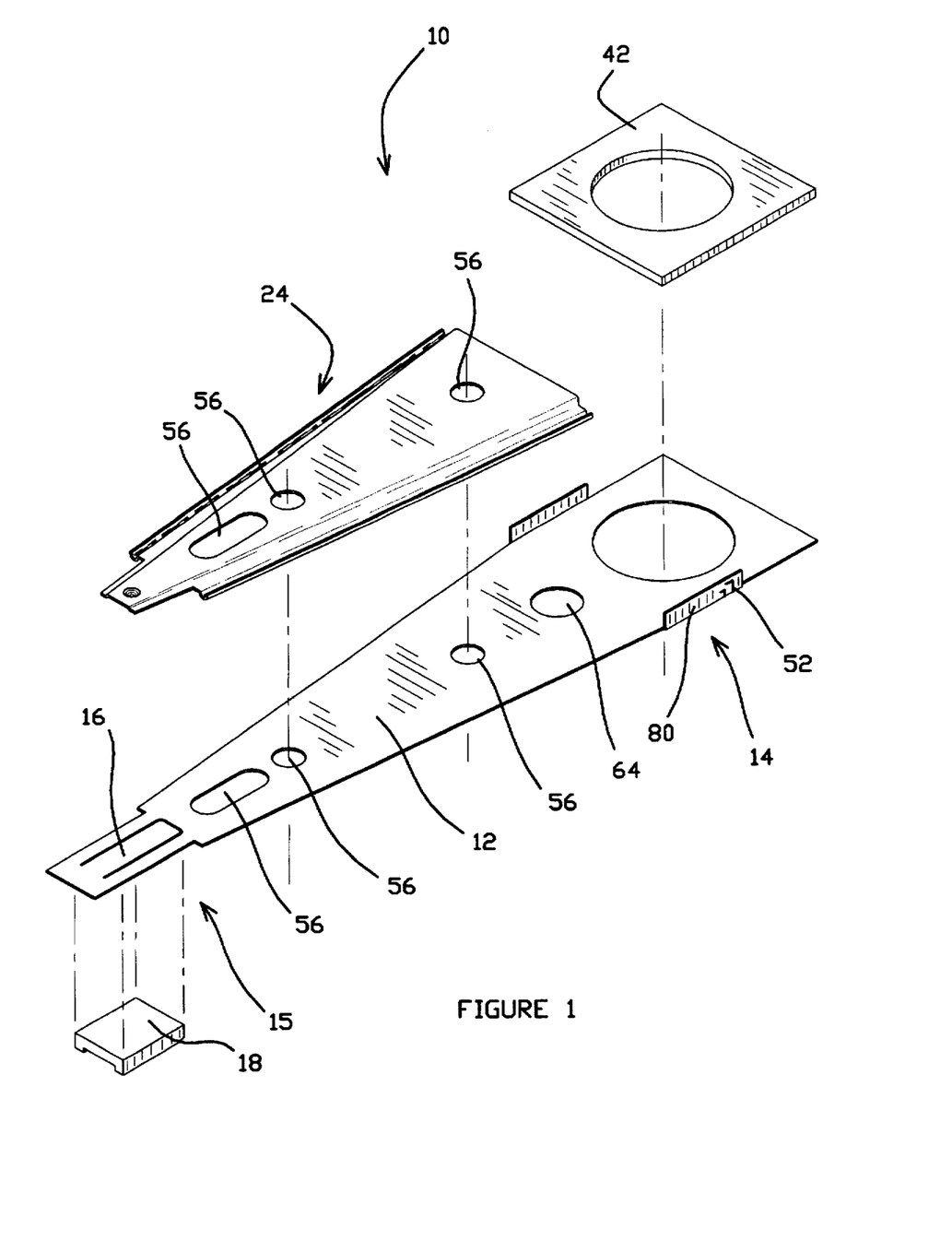
FIG. 1 is a perspective exploded view of an embodiment of the present invention.
Figure 2:
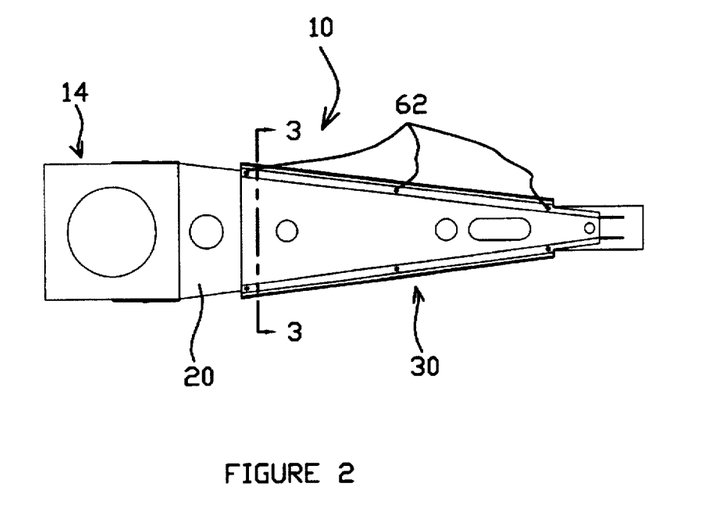
FIG. 2 is a top view of the assembled embodiment of FIG. 1.

FIG. 1 shows a perspective exploded view of a head suspension 10 according to the present invention. FIG. 2 shows the top view of an assembled version of the same suspension 10 of FIG. 1. Suspension 10 includes a load beam 12 having a proximal end portion 14, a distal end portion 15, and a spring region 20. Suspension 10 also includes a gimbal region 16 and a stiffened and rigid monocoque region 30.

Figure 4:
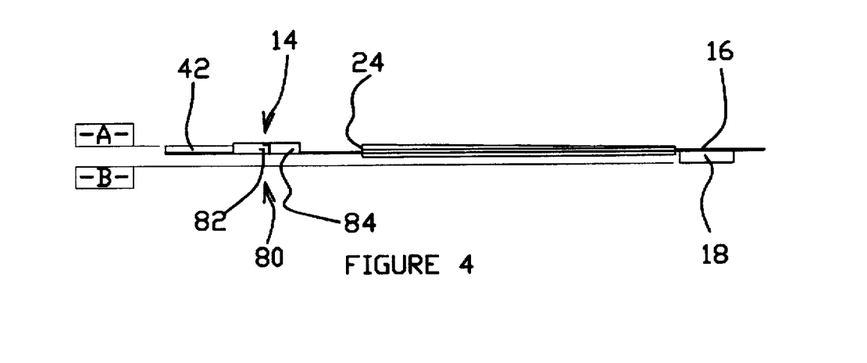
FIG. 4 is a side view of the suspension depicted in FIG. 2.
Figure 5:
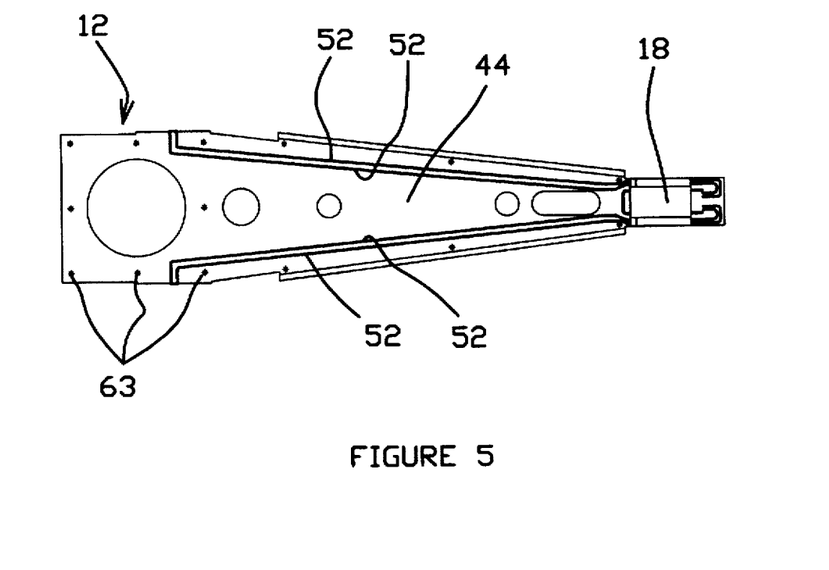
FIG. 5 is a bottom view of a suspension embodying features of the present invention, including conductors.

Gimbal region 16 is located at a distal end portion 15 and is constructed for supporting the read-write head assembly 18, shown in FIGS. 1 and 4, for gimballed motion relative to the surface of the data storage device (not shown). In the embodiment of FIG. 1, thanks to the thinner materials that the monocoque construction allows, the gimbal region 16 is part of the same structural element as the load beam 12. Shaping the distal end portion 15 of the load beam as a gimbal region 16 eliminates the need for an additional gimbal region structure and simplifies construction. In other embodiments the gimbal region 16 may be a separate element attached to the load beam 12 to become the distal end portion 15.

The gimbal region 16 illustrated in FIG. 1 comprises a cantilevered portion that extends proximally from the distal tip of the load beam 12, as defined by slots surrounding the cantilevered portion. A lower surface of the cantilevered portion provides amounting surface for the head assembly 18, while an upper surface of the cantilevered portion provides a load surface to which a point load is preferably provided to control gimballed motion.

Another detail shown in FIG. 1 is how the proximal end portion 14 can be shaped as necessary for attachment to an actuator arm (arm not shown), or, in a system without actuator arms, to any necessary attachment shape. The spring region 20 is adjacent to this proximal end portion 14 and in between the proximal end portion 14 and the rigid monocoque region 30. Spring region 20 provides needed vertical compliance for the load beam 12.

Figure 3:
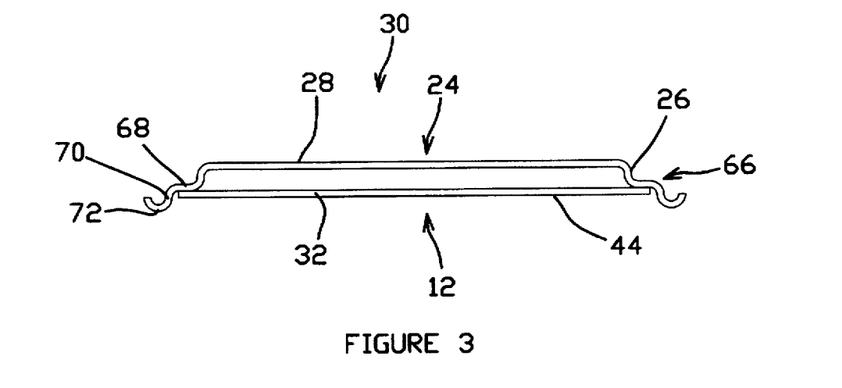
FIG. 3 is an enlarged view of a vertical cross-sectional cut at line 3—3 of the suspension depicted in FIG. 2.

As shown more clearly in FIG. 3, the monocoque region 30 includes a shell region 24 having a rigid floor region 32 and a ceiling region 28 separated and spaced from the rigid floor region 32. The whole monocoque region 30 can be a unitary part of the load beam 12. Yet, in the embodiment of FIGS. 1 and 3, the shell region 24 is a separate thin sheet material element which is formed to fit in an abutting complementary relationship over the load beam's rigid floor region 32. The depicted shell region 24 includes planar surfaces or regions that connect at sharp radial breaks. The shell region 24 is attached by welds 62, which can be seen in FIG. 2, to the top surface of load beam 12 to form the monocoque region 30. Lightening holes 56, such as those shown in FIG. 1 and 2, are made in selected reduced stress bearing areas to further lighten the load beam 12 and shell 24 without appreciably reducing its stiffness. The same holes 56 or additional ones can perform as alignment and tooling holes.

With reference to FIGS. 1 and 2, the shell region 24 includes a load portion that extends from the distal end of the shell region 24. The purpose of the load portion is to provide the load to the load surface of the gimbal region 16 to facilitate gimballed movement. Preferably, a load point dimple provides a point loading from the load portion of the shell region 24 to the load surface of the gimbal region 16.

FIG. 3 shows the closed figure cross-sectional profile of the monocoque region 30 at line 3—3 and how the shell region 24 may mount onto the load beam 12 to form the monocoque region 30. The monocoque structure has excellent longitudinal stiffness and torsional stiffness due to the high cross section stiffness obtained from the separation distance of the ceiling region 28 and the floor region 32. In the embodiment of FIG. 3, the side wall regions 26 support and separate the ceiling region 28 from the floor region 32. A step lip 66 extends from the edge of the side wall regions 26 to facilitate attachment. The step lip 66 includes a first bend region 68 extending generally outwardly and generally perpendicularly from the side flanges and a second bend region 70 extending generally away and perpendicularly from the first bend. As the edges of the thin shell are razor-sharp, the step lip 66 may finish in an electro-polished or U-bend lift surface 72 extending in a 180 degree soft radial break from the second bend.

The increased structural stiffness created by the design of the monocoque region 30 allows for thinner material to be used to construct the load beam 12, gimbal region 16, and the shell region 24. In this embodiment, the load beam 12 is a wedge-shaped stainless steel sheet ≈30 micrometers thick. The thickness of the material in a typical load beam is ≈65 micrometers. The separation distance in this embodiment between the ceiling region 28 and the floor region 32 of only 250 micrometers results in an overall thickness for the monocoque shell of 310 micrometers. This yields an increase in stiffness in the magnitude of $\approx(310/65)^3 \approx 108:1$ ratio. That is a hundred-fold increase in stiffness, without any significant increase in mass.

The thickness of the material in typical load beams often necessitated that the thickness of the spring regions be reduced by additional processes or that thinner gimbal regions be added in order to obtain the desired flexibility. However, in the version depicted in FIGS. 1 and 2, the uncommonly thin load beam material allows for the construction of spring regions where material removal is not necessary. In this specific suspension format, the monocoque shell 24 tapers down towards its distal end and the thin distal end portion 15 of the load beam 12 can be shaped as a rectangular tongue to naturally provide part of a gimballing spring region for attachment to the read-write head assembly 18. The gimbal region 16 could be shaped differently to adjust to other gimbal designs. An additional wider spring region 20, left uncovered in between the covered rigid floor region 32 and the proximal end portion 14, further improves vertical compliance.

Thanks to the monocoque region very few areas may need additional reinforcement. Supporting base plate 42, more clearly seen in FIGS. 1 and 4, is an example of possible added support for the proximal end portion 14. The surface dimensions of the supporting base plate 42 are congruent with the surface dimensions of the proximal end portion 14, to assure a perfect fit. Welds 63, seen in FIGS. 5–8, join the proximal end portion 14 to the supporting base plate 42. If additional vertical compliance is needed, spring region apertures 64, seen in FIGS. 1 and 2, or reduced thickness areas can be incorporated into the spring region 20.

In the embodiments of FIGS. 1–10, the suspension is essentially planar and the use of a raised shell region only disturbs the profile of a first face of the suspension shown in FIG. 2. The stiffness of the monocoque region 30 and the use of thinner materials that do not require additional surface processing leaves a second face 44, shown in FIGS. 5–8, with an essentially smooth and flat surface topology. The second face 44 includes a flat surface along the load beam 12 and a flat surface along the gimbal region 16. Taking advantage of the relatively smooth and flat second face 44, electrical conductors 52 extend longitudinally over at least a portion of the length of the second face 44 and act as electrical signal carriers to the read-write head assembly 18. The length, number, and position of the conductors 52 may change according to the signal transmission needs of a given suspension and head assembly.

Figure 6:
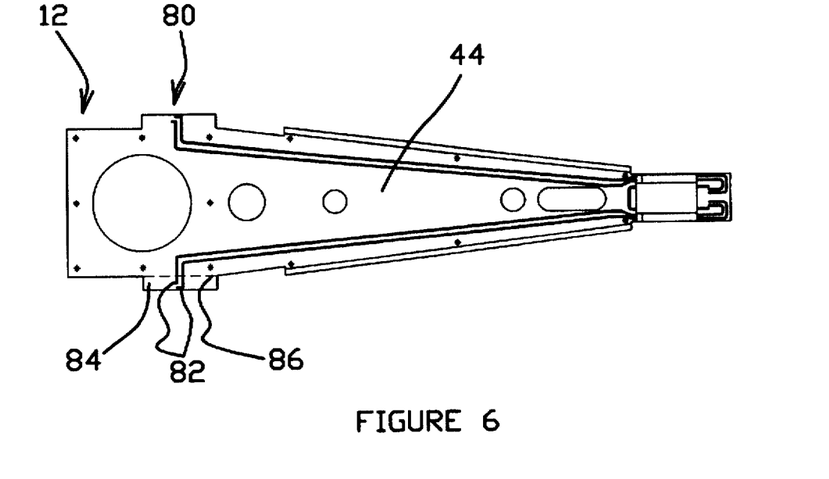
FIG. 6 is a view of same suspension depicted in FIG. 5, showing the side wings before they are bent.
Figure 7:
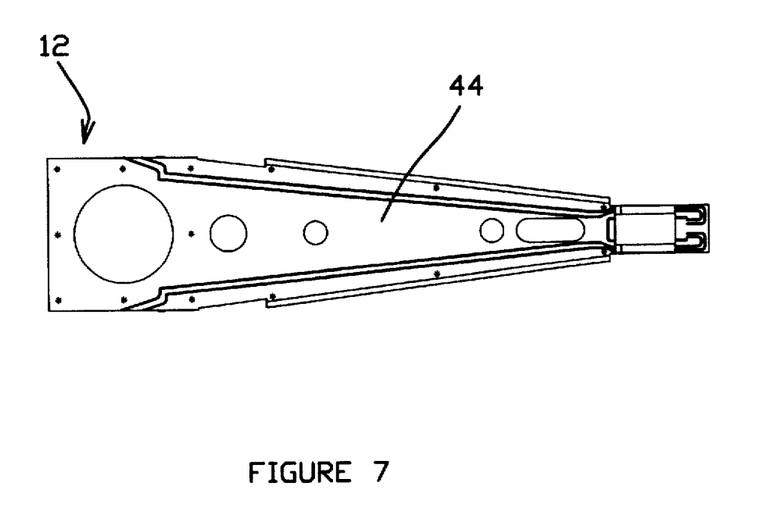
FIG. 7 is a bottom view of the suspension depicted in FIG. 2, further including conductors.
Figure 8:
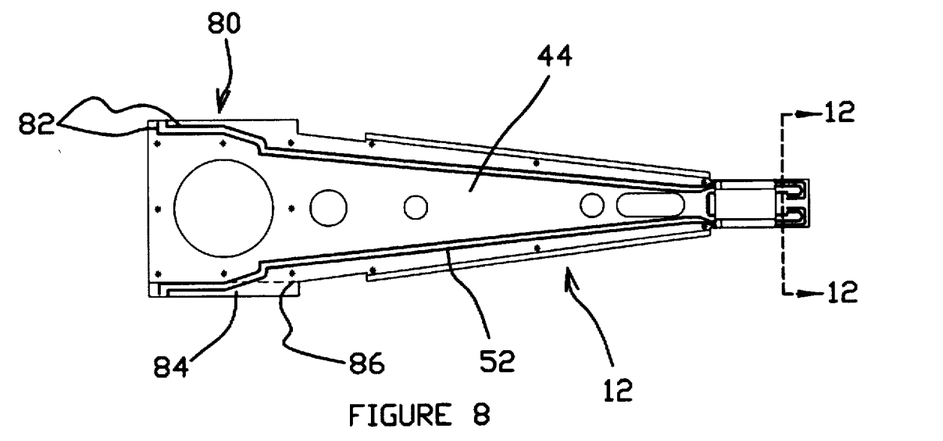
FIG. 8 is a bottom view of the suspension depicted in FIG. 2, showing the placement of the conductors and the side wings before they are bent.

Electrical connector tabs 80, better seen in FIGS. 1, 6, and 8, extend outwardly from sides of the proximal end portion 14 of the load beam 12 to facilitate connection to circuitry outside of the suspension 10. These connector tabs 80 include a proximal end portion 82 of the electrical conductors 52, side wings 84 extending outwardly in the same plane as the load beam 12, and an axis of bend 86 generally parallel to the sides of the proximal end portion 14. The side wings 84 may bend for easier connection. FIG. 6 is a view of the suspension 10 in FIG. 5 when the side wings 84 are not bent. To reduce the stress on the conductors at the bend region, the proximal end portion 82 of the conductors 52 may traverse the axis of bend 86 at an acute angle. A smaller angle between the conductors' proximal end portion 82 and the axis of bend 86 results on a reduced stress on the outer fibers of the conductors. The same angled layout may be used when conductors 52 traverse a spring region 20 or gimbal region 16. FIG. 7 shows the bottom view of a suspension 10 with bent side wings 84 and angled conductors 52 at their proximal end portion 82. FIG. 8 is a view of the suspension 10 in FIG. 7 where the wings 84 are not bent. This shows more clearly the angle of the conductors' proximal end portion 82 across the axis of bend 86.

On the suspension 10, the electrical conductors 52 are placed inside and spaced from the weld pattern to prevent thermal damage. They can be printed circuit conductors, flex circuit conductors, or other reliable conductors. They can be formed directly on the suspension 10 using known methods such as vapor deposition or photolithography. Another interconnect system may include conductors made of a conductive material laid down in long strips atop a thin insulating coating 50 which electrically isolates the conductors from the load beam 12. As shown by the cross-sectional cut at line 12—12 depicted in FIG. 12, in load beams made of conductive materials, a dielectric insulating coating 50 is bonded in between the load beam 12 and the conductors 52. An adhesive may double as an insulating coating 50 and as a bonding means. A layered structure of a metal load beam, a dielectric layer, and a conductor layer is also possible.

For non-conductive suspensions or for independently electrically insulated conductors, the insulating coating 50 would not be necessary. In the present stainless steel embodiment, the insulating coating 50 consists of polyamide resin $\approx 6.35$ micrometers thick. The combination dielectric adhesive and an anodized aluminum load beam and/or monocoque shell also could be used. The conductors 52 are copper $\approx 6.35$ micrometers thick and $\approx 50$ micrometers wide. Other materials with good conductivity, such as copper alloys, can also be used. The conductors 52 are spaced $\approx 50$ micrometers apart from each other. Other similar materials commonly used in the industry of varying thicknesses and widths also could have been used for both the insulating coating 50 and the conductors 52.

Figure 12:
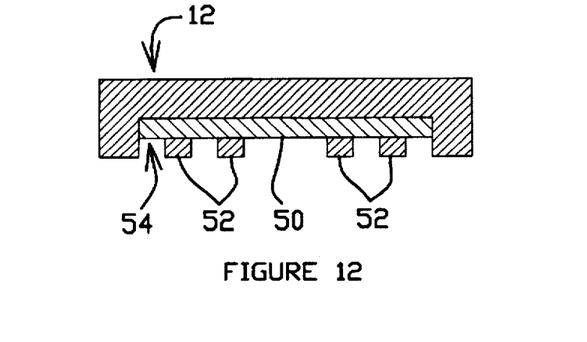
FIG. 12 is a much enlarged view of a cross-sectional cut at line 12—12 of a partial groove in the flat face of a gimbal region, receiving a dielectric coating and conductors.

In order to solve potential problems caused by conductor mechanical yield stress in the spring regions due to the sandwich construction of the load beam 12, insulating coating 50, and conductors 52, a groove 54, shown by FIG. 12, can be manufactured or etched on selected areas of the second face 44 of the suspension 10 to receive the insulating coating 50 and/or the conductors 52. Critical flexibility areas on which grooves 54 may be placed are the surface of the spring region 20 of the load beam 12 and the surface of the gimbal region 16. The grooves 54 also may run the whole length of the conductors 52 on the suspension 10. Laying the conductors 52 in the partial groove 54 reduces the distance from the outer fibers of the conductors 52 to the neutral axis of bend of the spring regions. This reduces the stress effects on the conductors 52 and the rigidity the additional elements add to the spring regions.

In several embodiments, such as those shown in FIGS. 1–4, 7, and 8, the shell region 24 is made preferably of 30 micrometer-thick stainless steel. It attaches by six weld points to the floor region 32 of the load beam 12. The shell region 24 also can be adhesively bonded or crimped to the load beam 12 or can be molded of the same piece of material than the load beam 12. For still other embodiments, the shell region 24 and the load beam 12 can be made of different materials. Preferred materials are those with an elastic modulus and a density similar to those of stainless steel. In order to satisfactorily flex at the spring regions, the material for the load beam 12 element must be formable to set the load that balances the slider's air bearing pressure. But it must also have a high yield strength to prevent plastic deformation during normal operation. In contrast, the shell region 24 experiences minimal flexure, so an anisotropic material, such as alumina ceramics, can be used, as well as isotropic materials such as metals, alloys, or graphite fibers.

Figure 9:
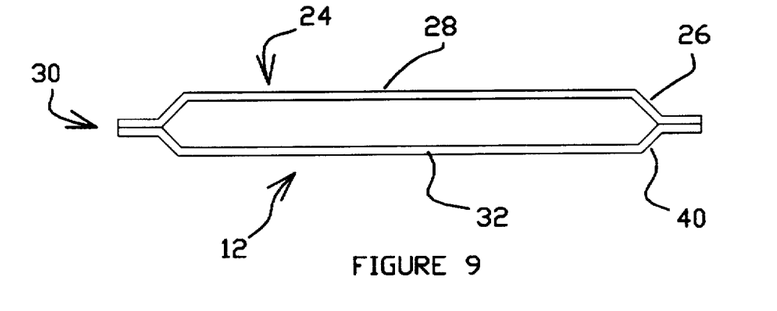
FIG. 9 is an enlarged view of a cross-sectional cut at line 3—3 of a version of a suspension embodying features of the present invention.
Figure 10:
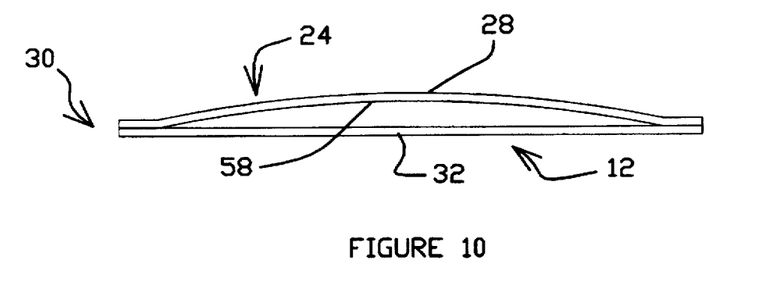
FIG. 10 is an enlarged view of a cross-sectional cut at line 3—3 of a version of a suspension embodying features of the present invention.
Figure 11:
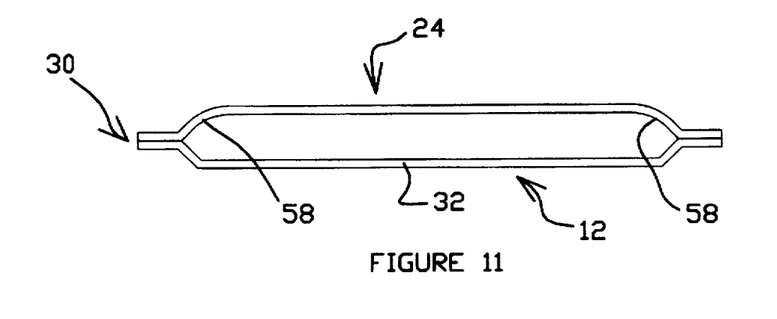
FIG. 11 is an enlarged view of a cross-sectional cut at line 3—3 of a version of a suspension embodying features of the present invention.

The shape of the monocoque region 30 may vary in different versions of the present invention. FIG. 9 illustrates the cross-sectional cut at a line 3—3 of another version of a suspension 10 embodying features of the present invention. In this version shell side walls regions 26 consist of longitudinally extended flanges which are attached to longitudinally extending load beam flanges 40 which project away from the rigid floor region 32. In other versions, such as those depicted in the cross-sectional cuts in FIG. 10 and FIG. 11, the monocoque shell region 24 can include a concave surface 58. In yet another embodiment (not shown), the monocoque shell region 24 and the load beam 12 could be one single piece. This piece can either be casted directly with a monocoque region 30, or formed by bending a side flap from the load beam 12 over the floor region 32 to form the shell region 24 and then securing the edges of the flap to the edges of the load beam 12 to form the monocoque region 30.

Basic Parameters of a Process for Making Invention

The suspension 10 of the invention may be made by the following process:

First, form a load beam 12 of a substantially planar and resilient material. The load beam 12 has a proximal end portion 14 and a gimbal region 16 at a distal end portion 15. The proximal end portion 14 may be shaped for attachment to an actuator arm for systems that so require it. The gimbal region 16 is shaped for supporting a read-write head assembly 18 for gimballed motion relative to the surface of the data storage device. The load beam 12 also has a spring region 20 adjacent the proximal end portion 14 and a rigid floor region 32 between the spring region 20 and the gimbal region 16.

The second step is to shape a shell element or region 24, preferably out of a thin sheet of material. In this shell region 24, side wall regions 26 support a ceiling region 28.

The last step is to attach the shell region 24 over the rigid floor region 32 of the load beam 12, whereby the shell region 24 and the load beam 12 form a stiffened monocoque region 30 encasing a chamber between the load beam 12 and the shell region 24.

The suspension 10 of the present invention offers stiffness that is orders of magnitude greater than that of the prior art, without any significant increase in mass. In fact, the described suspension can have a lower mass, be easier and more efficient to manufacture, and reduce expensive etching and tooling. In addition, the absence of surface topology processing allows a flat, smooth, and unmarred surface for placing the electrical conductors 52 that carry electrical signals to and from the head assembly 18.

Although the present invention has been described with reference to preferred embodiments, workers skilled in the art will recognize that changes may be made in the form and detail without departing from the spirit and scope of the invention as set forth in the claims which follow.

What is claimed is:

1. A suspension for positioning a floating head assembly over selected tracks on the surface of a rotating data storage device, said suspension comprising, in combination:

a resilient load beam manufactured from a first sheet of sheet material, said load beam having a proximal end portion, a distal end portion, and a spring region adjacent the proximal end portion;

a gimbal region located at the distal end portion of the load beam for supporting a head assembly for gimballed motion relative to the surface of the data storage device, said gimbal region having a load surface and a mounting surface for attachment to a head assembly; and a rigid monocoque region located on the load beam between the spring region and the gimbal region, said monocoque region including a first rigid floor region comprising a portion of said first sheet and a shell operatively connected with said first rigid region, the shell including a second rigid region spaced from the first rigid region and a load portion contacting and thus for providing a load to said load surface of said gimbal region, said monocoque region having a closed plane figure cross sectional profile whereby a chamber is enclosed between the shell and the load beam.

2. The suspension of claim 1, wherein said gimbal region includes a cantilever portion extending proximally from a distal end of said load beam having a free end that is opposite to an integral connection of the cantilever portion to said load beam.

3. The suspension of claim 1 further including a dimple extending from one of said load portion of said shell and said load surface of said gimbal region to provide a point contact whereby a load is transferred from the load portion to the load surface.

4. The suspension of claim 1, wherein the gimbal region is formed integrally with the load beam.

5. The suspension of claim 1, wherein the shell further comprises sidewalls supporting and spacing the second rigid region over at least a portion of the first rigid region.

6. The suspension of claim 1, wherein the second rigid region of the shell includes a substantially flat planar surface and said shell further includes sidewalls having longitudinally extending flanges projecting generally away from the planar the surface and toward the first rigid region.

7. The suspension of claim 1, wherein at least the second rigid region of the shell includes a concave surface over the first rigid region.

8. A method for manufacturing a suspension for attachment to an actuator arm for positioning a floating read-write head assembly over selected tracks on the surface of a rotating data storage device, said method of manufacturing comprising the steps of:

forming a load beam of a substantially planar and resilient first sheet of material to have a proximal end portion for attachment to the actuator arm and to have a gimbal region located at a distal end thereof for supporting a head assembly for gimballed motion relative to the surface of the data storage device, wherein the gimbal region includes a load surface and a mounting surface for attachment to a head assembly, the load beam also being provided with a spring region adjacent the proximal end portion and a first rigid region between the spring region and the gimbal region;

forming a shell element from a second sheet of sheet material to have a second rigid region and a load portion;

attaching the shell element to the load beam with the second rigid region covering at least a portion of the first rigid region and with the load portion of the shell positioned to contact and thus provide a load to the load surface of the gimbal region;

whereby the shell element increases the stiffness of at least a portion of the load beam into a stiffened monocoque region encasing a chamber between the load beam and the shell element.

9. The method of manufacture of claim 8, further including using welds to attach the load beam and the shell element.

10. The method of manufacture of claim 8, further including using an adhesive to attach the load beam and the shell element.

11. The method of manufacture of claim 8, wherein the load beam and the shell element are attached by being crimped together.

* * * * *